United States Patent [19]

Chivari

[11] 4,164,877

[45] Aug. 21, 1979

[54] COUPLING FOR THE VIBRATION-DAMPING TRANSMISSION OF TORQUES

[76] Inventor: Ilie Chivari, Berliner Strasse 1, 4690 Herne 2, Fed. Rep. of Germany

[21] Appl. No.: 803,464

[22] Filed: Jun. 6, 1977

[30] Foreign Application Priority Data

Jun. 12, 1976 [DE] Fed. Rep. of Germany ....... 2626414

[51] Int. Cl.² .......................... F16F 15/10; F16D 3/14
[52] U.S. Cl. ........................................ 74/574; 64/1 V; 64/11 R; 64/27 NM; 188/1 B
[58] Field of Search ........... 188/1 B; 64/1 V, 27 NM, 64/11 R, 12; 74/574

[56] References Cited

U.S. PATENT DOCUMENTS

| | | | |
|---|---|---|---|
| 732,079 | 6/1903 | Hunt | 64/12 |
| 1,414,411 | 5/1922 | Herreshoff et al. | 64/11 R |
| 1,605,356 | 11/1926 | Leipert | 64/12 |
| 2,098,703 | 11/1937 | Geyer | 64/11 R |
| 2,633,719 | 4/1953 | Riopelle | 64/27 NM |
| 3,138,012 | 6/1964 | Smirl | 64/27 NM |
| 3,216,267 | 11/1965 | Dolza | 64/27 NM |
| 3,354,670 | 11/1967 | Fowick | 64/11 R |
| 3,813,897 | 6/1974 | Hiersig | 64/11 X |
| 3,901,101 | 8/1975 | McGavern | 74/574 |
| 3,952,546 | 4/1976 | Nakano et al. | 64/27 NM |

FOREIGN PATENT DOCUMENTS

| | | | |
|---|---|---|---|
| 1248272 | 10/1960 | France | 64/11 R |
| 2314047 | 10/1974 | Fed. Rep. of Germany | 64/27 NM |
| 2318612 | 11/1974 | Fed. Rep. of Germany | 74/574 |

*Primary Examiner*—Leslie Braun
*Attorney, Agent, or Firm*—Laney, Dougherty, Hessin & Beavers

[57] ABSTRACT

A coupling for the vibration-damping transmission of torques, comprising an inner coupling member, which is provided with a substantially radial flange, and an annular outer coupling member, which surrounds the inner coupling member substantially concentrically. An annular toroidal compression cushion of elastomeric material, which is U-shaped in longitudinal section is connected to the outer coupling member along its outer edge and to the flange of the inner coupling member along its inner edge. An annular chamber is defined inside the compression cushion. A plurality of non-extensible ropes, which are each connected to the outer and to the inner coupling members, in uniform distribution along the periphery of the coupling members, are arranged substantially in longitudinal planes around the annular toroidal compression cushion. The compression cushion is loaded and resiliently deformed by compression through the ropes under the action of a torque to be transmitted, when the coupling members are rotated relative to each other from a position of rest.

24 Claims, 4 Drawing Figures

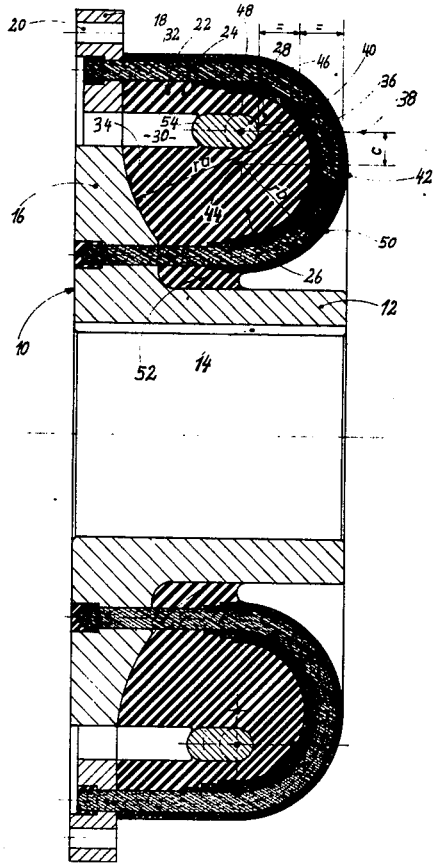

COUPLING FOR THE VIBRATION-DAMPING TRANSMISSION OF TORQUES

BACKGROUND OF THE INVENTION

1. Field of the Invention

The invention relates generally to improvements in coupling devices, and more particularly, but not by way of limitation, to a coupling for the vibration-damping transmission of torques, comprising: an inner coupling member, which is provided with a substantially radial flange, and an annular outer coupling member, which surrounds the inner coupling member substantially concentrically, an annular toroidal compression cushion of elastomeric material, which is U-shaped in longitudinal section and which is connected to the outer coupling member along its outer edge and to the flange of the inner coupling member along its inner edge, an annular chamber being defined inside the compression cushion, and a plurality of non-extensible ropes, which are each connected to the outer and to the inner coupling members, in uniform distribution along the periphery of the coupling members, and are arranged substantially in longitudinal planes around the annular toroidal compression cushion, the compression cushion being loaded and resiliently deformed by compression through the ropes under the action of a torque to be transmitted, when the coupling members are rotated relative to each other from a position of rest.

2. Description of the Prior Art

A vibration-damping coupling of this general type is known from German patent specification 2 318 612.

In the prior art coupling the coupling members are annular bodies arranged concentric to each other, which are interconnected through a pair of toroidal compression cushions arranged on both sides of the annular bodies. The compression cushions consist of fluid-filled, non-extensible hulls of flexible fluid-tight material. They are generally toroidal, the center of the cross-sectional circle of the compression cushions being located at an axial distance, with respect to the coupling axis, from the annular bodies. In this way the compression cushions have substantially the shape corresponding to their maximum volume, when the coupling is in its state of rest. The hulls consist of rubber or the like with non-extensible ropes extending therearound embedded therein and affixed to the coupling members. With relative rotation of the coupling members under the action of a torque to be transmitted, there will be a relative angular offset of the points of attachment of the ropes to the inner and the outer coupling members. Due to this angular offset the loops formed by the ropes are shortened in axial direction. Thus, they exert pressure on the compression cushions, namely by compressive load through the ropes, whereby the volume of the fluid-filled hulls is varied. The compression cushions counteract this volume variation by an elastic resistance. In this way resilient and vibration-damping force transmission between the coupling members is achieved.

In these prior art couplings the compression cushions consist of fluid-filled hulls, preferably filled with compressed air. The resistance is caused by a volume variation, and thus by a pressure variation of the fluid enclosed in the hulls, accompanying relative rotation of the coupling members. This design requires filling of the hulls with fluid under well-defined pressure. This pressure, and thereby the stiffness of the coupling, may vary as a function of temperature. There is also the risk that the pressure may drop gradually due to leakage.

Furthermore, couplings are known in which coupling members are annular bodies arranged concentrically to each other, which are interconnected through annular toroidal rubber bodies. With rotation of a driving coupling member relative to a driven coupling member, the driving coupling member pulls at the rubber body in a peripheral direction. The tensile stress is then transmitted to the driven coupling member. Thereby the rubber bodies are subjected undesirably to tension and shearing, when the torques are transmitted. Such type of load impairs the torque transmitting capacity both of the toroidal rubber bodies and of the attachment of the rubber bodies to the driving and driven coupling members.

SUMMARY OF THE INVENTION

It is the object of the invention to provide a coupling for the vibration-damping transmission of torques which has increased load capacity and useful life as compared to prior couplings.

In particular it is an object of the invention to eliminate the necessity of maintaining and generating a gas pressure in a hull, and in addition to avoid undesirable tensile stress in torque transmitting rubber bodies.

With a coupling of the type described above, these objects are achieved, in accordance with the invention, in that the compression cushion is a permanent shape rubber element having an annular, cylindrical chamber open towards one side in an axial direction.

In accordance with the invention, resiliency of the coupling in a peripheral direction is achieved by a rubber element. This rubber element, however, is not a flexible hull filled with gas under pressure, in contrast to the coupling of German patent specification 2 318 612, but is a permanent shape rubber element, and thus a body which retains its toroidal shape in non-loaded state but which can be deformed resiliently under the action of a force acting thereon. Contrary to the prior art coupling in which the two coupling members are interconnected by a toroidal rubber body, the rubber body in the coupling of the present invention is not loaded by tension but by compression through the ropes. Therefore with relative rotation of the coupling members, the rubber element will adopt another shape being deformed elastically. However, it will not be pulled into this other shape but will be pressed into this shape through the ropes. In this way the rubber element is subjected to a compression and shearing stress, which constitutes a substantially more favorable type of load for rubber than the tensile and shearing stress. Contrary to the gas-filled hulls of German patent specification 2 318 612, however, there is practically no volume variation of the compression cushion. It has been found that with such a design a coupling having good resiliency and damping characteristics can be achieved, which can withstand large angular rotation of the coupling elements relative to each other under the action of a correspondingly high torque without permanent deformation, and which has a long useful life.

It is essential for the torque transmitting capacity of the coupling that the rubber in the rubber element is loaded as uniformly as possible, when a torque is transmitted. This is achieved in accordance with a further design feature of the invention in that the rubber element is substantially thicker on its radially inner side connected to the inner coupling member than on its radially outer side connected to the outer coupling member.

The force acting, when a torque is transmitted, is smaller at the outer coupling member having the larger radius than at the inner coupling member. Through the novel design of the rubber element mentioned above, the elastic deformation of the rubber, which is required for the transmission of these forces, is substantially uniform within the whole volume of the rubber element, as is also the fulling energy within the rubber element and the heating caused thereby. Thus, the rubber element is loaded uniformly also in this respect.

In order to achieve a loading of the contact faces as uniformly as possible during the transmission of the torques, it is advantageous for the ratio of the areas of the contact faces between the rubber element and the outer coupling member, on one hand, and the flange of the inner coupling member, on the other hand, to be approximately inverse to the ratio of the distances from the axis of rotation of the mean points of engagement of the forces.

In this context, "points of engagement of the forces" are those points in the contact face, through which points the force is transmitted from the outer coupling member to the rubber element and from the rubber element to the inner coupling element, respectively, or vice versa.

Furthermore, it has been found advantageous, for the flange of the inner coupling member to be provided with a concave surface on the side facing the rubber element, the rubber element contacting said concave surface. This makes it possible that the contact face is enlarged and, in addition, that the individual portions of the contact face are substantially equally spaced from the points through which the torque is transmitted from the outer coupling member and the outer "U-leg" of the cross-section of the rubber element to the inner U-leg and the inner coupling member.

An optimum design consists in that the surface of the flange is curved, in each longitudinal plane, about a point, which is located approximately on the extended notional central surface of the annular chamber and about in the middle between the inner surface of the annular chamber and the outer surface of the rubber element.

By the curvature of the surface of the flange at the inner coupling member uniform loading of the contact face is insured. The risk is eliminated that a correspondingly higher shearing stress might become effective at one or more points along the contact face which are closer to the force transmitting points than other points, resulting in the rubber element beginning to tear off from the flange of the inner coupling member, in particular when the rubber element is attached to the coupling member on the contact face by vulcanizing.

In order to insure uniform compression loading of the rubber element by ropes and to make sure that the rubber element cannot expand outwards between the ropes, a substantial design feature of the invention consists in that flexible, but non-extensible, fabric mats are arranged between the rubber element and the ropes inside the rope loops. Thereby the pressure exerted by the ropes upon relative rotation of the coupling members is distributed more uniformly over the rubber element.

Due to the fact that the rubber element is prevented or at least substantially restrained from evading or extruding outwards between the ropes, the rubber is stressed more uniformly and the stiffness of the coupling is increased. By varying the dimensioning of and/or varying the number of the fabric mats, the stiffness of the coupling can be adapted to the respective requirements.

Furthermore, it has proved advantageous to employ a non-extensible, preferably rigid, annular body positioned or arranged in the axially innermost portion of the cylindrical annular chamber. Such an annular body prevents deformation of the rubber element of a type causing the formation of folds of rubber on the bottom of the annular chamber which could otherwise get into contact with each other. With a pulsating load there would then be a frictional movement of the folds relative to each other or to the adjacent wall portions, which would result in undesirable heating.

In accordance with a further design feature of the invention, a first set and a second set of ropes may be provided, and the ropes of one set may be inclined towards one side and the ropes of the other set may be inclined to the other side in peripheral direction relative to the longitudinal direction. It can thereby be achieved that the loops formed by the ropes are shortened more in axial direction and thus the rubber element is correspondingly deformed more than with an arrangement in which the loops extend in longitudinal planes of the coupling in the position of rest.

Preferably each rope of one set crosses a respective rope of the other set.

Other objects and advantages of the invention will be evident from the following detailed description when read in conjunction with the accompanying drawings.

DESCRIPTION OF THE PREFERRED EMBODIMENTS

Figure 1:
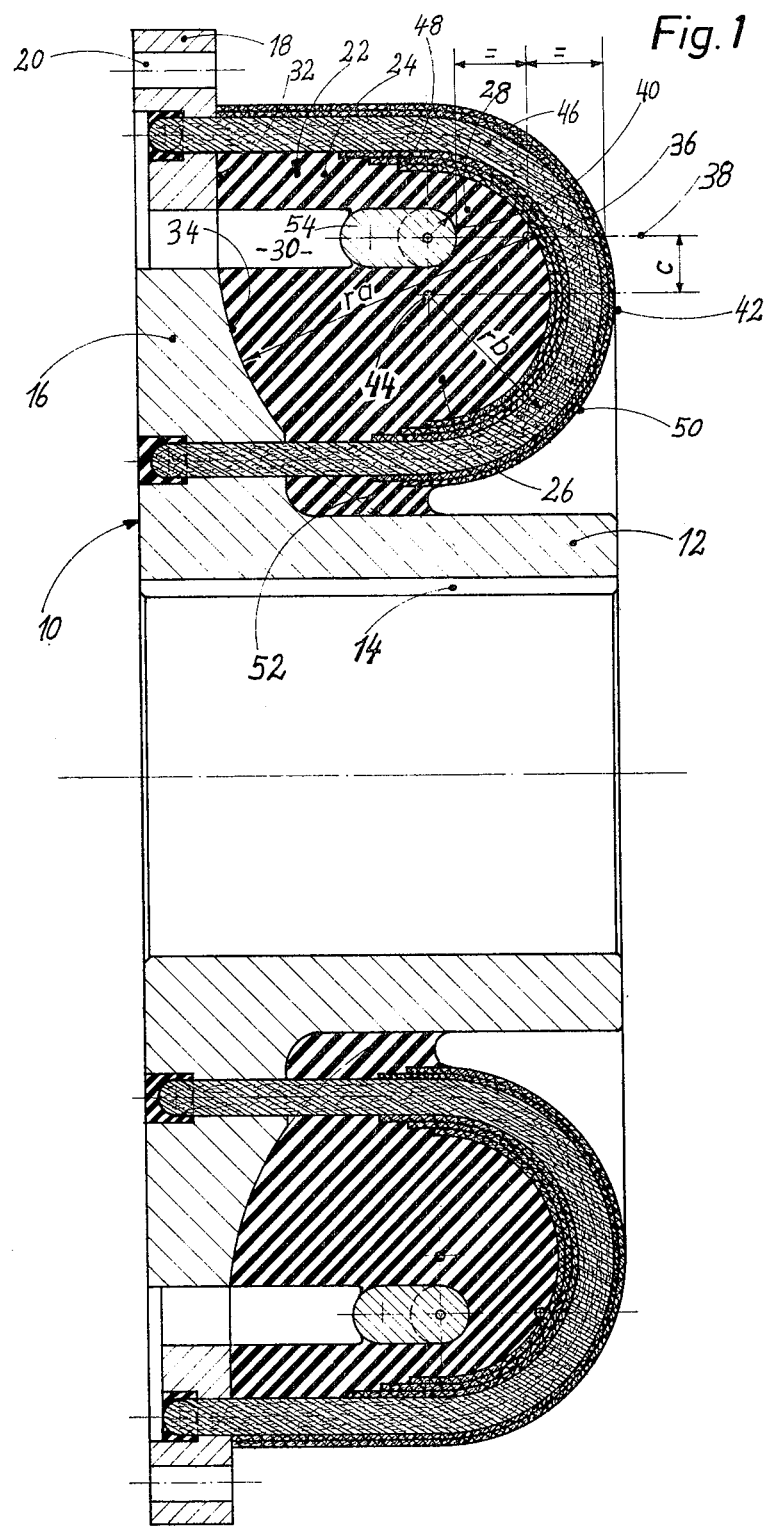
FIG. 1 is a longitudinal sectional view of one embodiment of a coupling of the invention.

A first coupling element 10 has a hub portion 12, which can be connected by means of a spline 14 to a shaft to be driven, as well as a radial flange 16. A second outer coupling member 18 is annular and is arranged concentric with respect to the flange 16. The outer coupling member 18 has axial bores 20 along its periphery. By these bores the coupling member 18 may be screwed to the machine to be connected, for example a flywheel or a shaft flange. The inner coupling member 16 and the outer coupling member 18 are interconnected by a rubber element 22. The rubber element is generally toroidal and is substantially U-shaped in cross-section. In its cross-section, it comprises a portion 24 corresponding to the outer or upper leg of the "U" and a portion 26 corresponding to the inner or lower leg of the "U", between which legs a central portion 28 is located. An annular chamber 30 is defined between the outer portion 24 and the inner portion 26, which chamber is open towards the left in FIG. 1. The rubber element 22 is attached by vulcanizing to the outer coupling member 18 with the end face of the outer portion 24 on an outer annular contact face 32. The rubber element 22 is attached by vulcanizing to the flange 16 of the inner coupling member 10 with the end face of its inner portion 26 along an annular contact face 34.

As can clearly be seen from FIG. 1, the inner portion 26 of the rubber element 22 is substantially thicker than the outer portion 24. Thereby a uniform deformation throughout the whole volume of the rubber element 22 is achieved, as has already been mentioned. The contact face 34 is concave in each longitudinal section and is curved about a respective center of curvature 36, which is located on the central surface 38 of the annular chamber 30 and in the middle between the inner surface 40 of the annular chamber 30 and the outer surface 42 of the rubber element. This point 36 is the mean point of engagement for the transmission of force from the upper or outer portion 24 of the rubber element to the lower or inner portion 26. The curvature of the contact face 34 insures that all points of the contact face have the same distance $r_a$ from this point of engagement. The outer surface 42 of the rubber element is curved, in each longitudinal section about a center 44 which is offset radially inwards relative to the central surface 38 of the annular chamber 30 by a dimension C and is located in a radial plane passing approximately through the end of the annular chamber or space 30.

Ropes 46 are vulcanized into the rubber element, said ropes being attached to the outer coupling member 18 and to the inner coupling member 10 and forming loops substantially lying in respective longitudinal planes, for example the plane of the paper in FIG. 1, said loops being placed around the outside of the rubber element 22. A plurality of fabric mats 48, which are flexible but non-extensible, are arranged inside the ropes 46, which are curved with a radius $r_b$ around the point 44. These fabric mats consist of a fabric which is embedded in a rubber layer. These fabric mats are connected to the rubber element 22 and the ropes 46 by vulcanizing. Similar fabric mats 50 are placed also around the outside of the ropes 46 and are connected thereto and to the rubber element 22 by vulcanizing. An inner portion 52 of the rubber element 22 is connected to the hub 12 of the inner coupling member 10 by vulcanizing and overlies the inner edges of the outer fabric mats 50.

A ring 54, which is non-extensible and preferably rigid, is located in the annular chamber 30. The ring may have oval or, as indicated in dashed lines in FIG. 1, circular cross-section. The ring 54 prevents the formation of folds on the inner wall 40 of the annular chamber 30, which folds might contact each other or adjacent wall portions. Such contact could result in frictional movement and in undesirable generation of heat. In addition this ring 54 serves to take up the centrifugal forces acting on the rubber element 22 with quick rotation.

Figure 2:
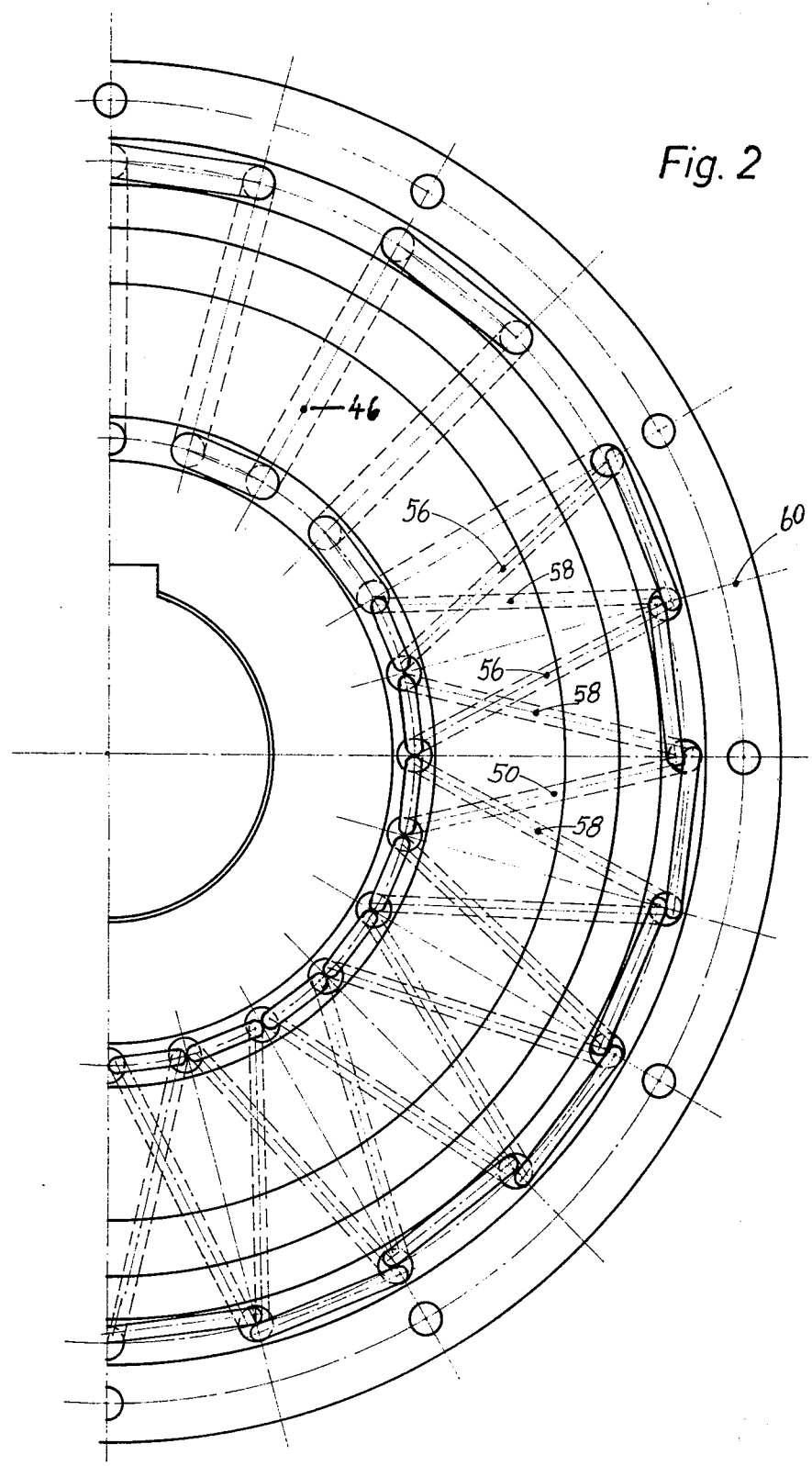
FIG. 2 is a partial end elevational view taken along line 2—2 of FIG. 1.

As can be seen from the upper portion of FIG. 2, the ropes 46 may be arranged in loops which extend substantially in longitudinal planes of the coupling. In the righthand and lower portion of FIG. 2, however, a possibility is illustrated in which two sets of ropes 56 and 58 are provided, of which one is inclined towards one side in first peripheral direction relative to a longitudinal plane 60 and the respective other one is inclined towards the other side in a second peripheral direction relative to this longitudinal plane. With such an arrangement the stiffness of the coupling is increased. Preferably, the arrangement is such that each rope 56 of one set crosses a respective rope 58 of the other set. This arrangement of ropes may be provided optionally without the need of making any alterations in the other elements of the coupling.

Figure 3:
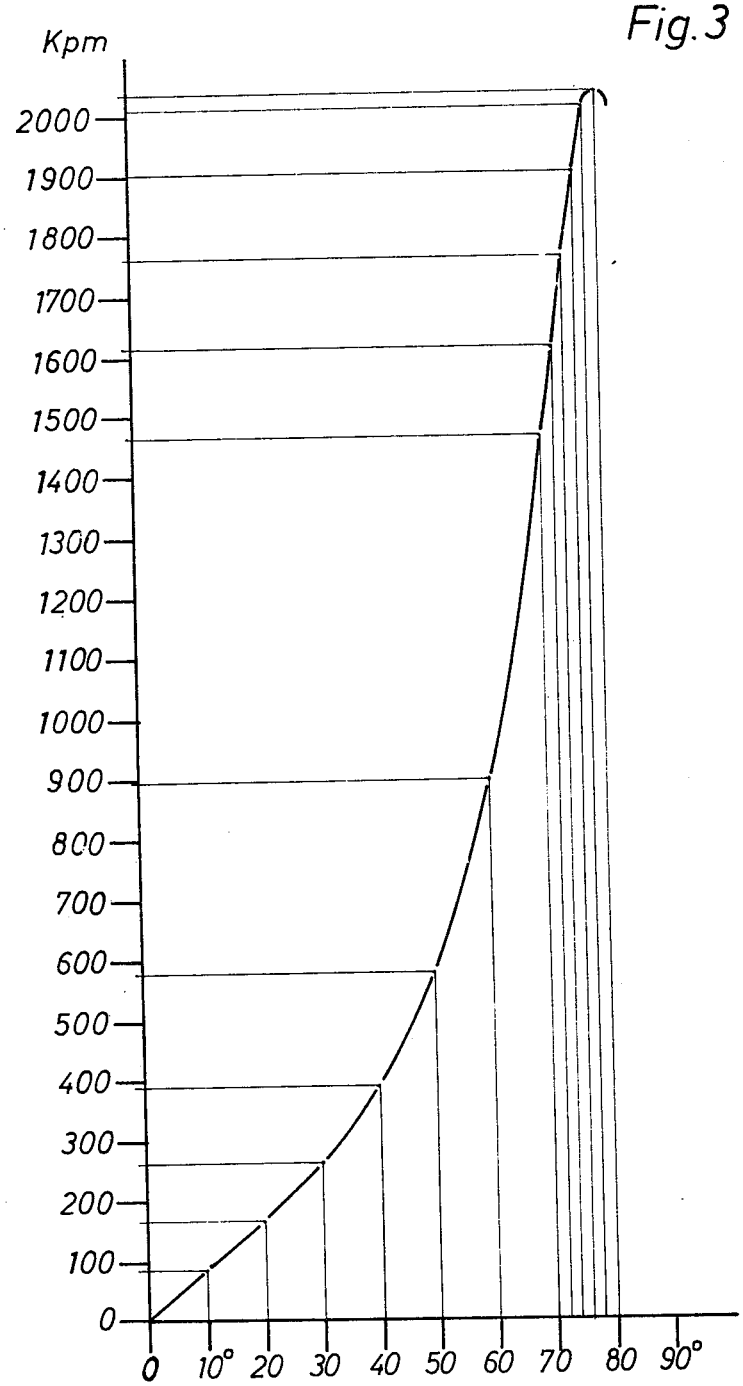
FIGS. 3 and 4 each graphically illustrate test results which are obtained with a coupling constructed according to FIG. 1, wherein the ordinate represents torque and the abscissa represents angular displacement between inner and outer coupling members.

FIG. 3 graphically illustrates test results which are obtained with a coupling designed in accordance with the invention and having an outer diameter of 375 millimeters. The abscissa therein indicates the angular rotation between the coupling members, while the ordinate gives the torques (in kilopondmeters up to the breakdown torque) transmitted with the respective angles. It is found that with such a coupling an angular rotation up to more than 70° can take place, a torque between 1500 and 1700 kilopondmeters being transmitted without a permanent deformation occurring. Only with a torque of more than 2000 kilopondmeters is the coupling destroyed.

Figure 4:
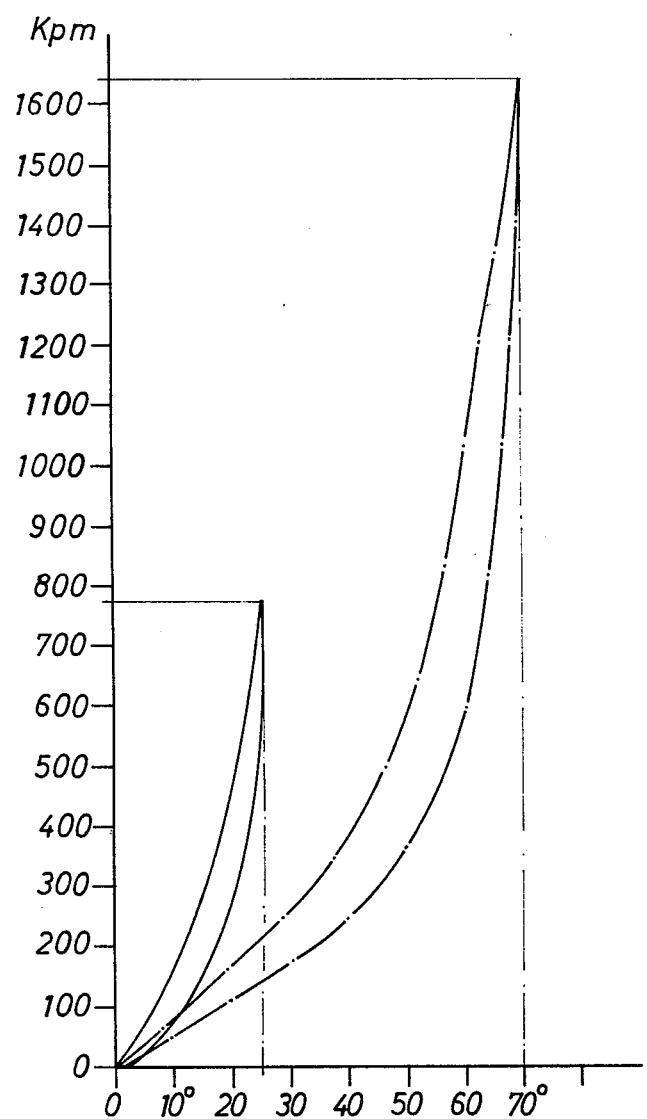

FIG. 4 illustrates the variation of the transmitted torque as a function of angular rotation between the coupling members, the angle being varied from 0° to 70°, and the coupling then returning into its state of rest. It is found that a torque of up to 1700 kilopondmeters is transmitted thereby. The coupling returns to an angle of 0° without permanent deformation. The area between the torque diagrams associated with running up and running down, respectively, is a measure of the damping achieved.

Changes may be made in the construction and arrangement of parts or elements of the various embodiments as described herein without departing from the spirit and scope of the invention as hereinafter defined.

What is claimed is:

1. Coupling for the vibration-damping transmission of torques, comprising: an inner coupling member, which is provided with a substantially radial flange, and an annular outer coupling member, which surrounds the inner coupling member substantially concentrically, an annular toroidal compression cushion of elastomeric material, which is U-shaped in longitudinal section and which is connected to the outer coupling member along its outer edge and with the flange of the inner coupling member along its inner edge, an annular chamber being defined inside the compression cushion, and a plurality of non-extensible ropes, which are each connected to the outer and to the inner coupling member, in uniform distribution along the periphery of the coupling members, and are arranged substantially in longitudinal planes forming rope loops around the annular toroidal compression cushion, the compression cushion being loaded and resiliently deformed by compression through the ropes under the action of a torque to be transmitted, when the coupling members are rotated relative to each other from a position of rest, characterized in that the compression cushion is a permanent shape rubber element having said annular, cylindrical chamber open towards one side in axial direction, said chamber being in communication with the atmosphere.

2. Coupling as set forth in claim 1, characterized in that the rubber element is substantially thicker on its radially inner side connected to the inner coupling member than on its radially outer side connected to the outer coupling member.

3. Coupling as set forth in claim 2 characterized in that the ratio of the areas of the contact faces between the rubber element and the outer coupling member, on one hand, and the flange of the inner coupling member, on the other hand, is about inverse to the ratio of the distances from the axis of rotation of the mean points of engagement of the forces.

4. Coupling as set forth in claim 2 characterized in that the flange of the inner coupling member has a concave surface on the side facing the rubber element, the rubber element contacting said concave surface.

5. Coupling as set forth in claim 4 characterized in that the surface of the flange is curved, in each longitudinal plane, about a point, which is located approximately on the extended central notional surface of the annular chamber and about in the middle between the inner surface of the annular chamber and the outer surface of the rubber element.

6. Coupling as set forth in claim 5, characterized in that the outer surface of the rubber element is curved in longitudinal section about a point which is offset radially inwards relative to the annular chamber and is located in a radial plane passing approximately through the end of the annular chamber.

7. Coupling as set forth in claim 1, characterized in that flexible but non-extensible fabric mats are arranged between the rubber element and the ropes inside the rope loops.

8. Coupling as set forth in claim 7, characterized in that the fabric mats consist of a fabric embedded in rubber and are connected to the ropes by vulcanizing.

9. Coupling as set forth in claim 8, characterized in that additional flexible but non-extensible fabric mats having a fabric embedded in rubber are vulcanized on the outside of the ropes vulcanized into the rubber element.

10. Coupling as set forth in claim 1, characterized in that a non-extensible, preferably rigid, annular body is arranged in the axially innermost portion of the cylindrical annular chamber.

11. Coupling as set forth in claim 1, characterized in that first and second sets of ropes are provided and the ropes of one set are inclined towards one side and the ropes of the other set are inclined towards the other side in peripheral direction relative to the longitudinal direction.

12. Coupling as set forth in claim 11, characterized in that each rope of one set crosses a respective rope of the other set.

13. A coupling for providing vibration-damping transmission of torques therethrough, comprising:
an inner coupling member having a substantially radial flange;
an outer coupling member disposed about said inner coupling member substantially coaxially;
an annular toroidal compression cushion formed of elastomeric material into a permanent shaped resilient element, said compression cushion being substantially U-shaped in longitudinal section and being connected along its radially outer side to said outer coupling member and being connected along its radially inner side to the flange of said inner coupling member, and said compression cushion further defining an annular, substantially cylindrical chamber therein opening toward one side in an axial direction and communicating with the atmosphere; and
at least one non-extensible rope interconnecting said inner and outer coupling members, said rope forming a plurality of rope loops around said annular toroidal compression cushion in uniform distribution along the peripheries of said inner and outer coupling members, whereby said compression cushion is compressively loaded and resiliently deformed through tension applied to said at least one rope in response to a torque to be transmitted through said coupling when said inner and outer coupling members are rotated relative to each other from a position of rest.

14. The coupling as defined in claim 13 wherein said annular toroidal compression cushion is substantially thicker at its radially inner side connected to said inner coupling member than it is at its radially outer side connected to said outer coupling member.

15. The coupling as defined in claim 14 characterized further in that the ratio between the area of contact between the radially outer side of said annular compression cushion and said outer coupling member and the area of contact between the radially inner side of said annular compression cushion and the flange of said inner coupling member is approximately inverse to the ratio of the distances from the axis of rotation of said coupling and the mean points of engagement of the forces applied by the transmission of torque through said coupling.

16. The coupling as defined in claim 14 wherein the flange of said inner coupling member is characterized further as having a concave surface formed on the side facing said annular compression cushion, said concave surface being in contact with the radially inner side of said annular compression cushion.

17. The coupling as defined in claim 16 wherein said concave surface of the flange of said inner coupling member is curved, in each longitudinal plane, about a point located approximately on the extended central notional surface of the annular chamber of said annular compression cushion and approximately midway between the radially inner surface of the annular chamber and the radially outer surface of said annular compression cushion.

18. The coupling as defined in claim 17 characterized further in that the outer surface of said annular compression cushion is curved in longitudinal section about a point offset radially inwardly relative to the annular chamber and located in a radial plane passed approximately through the closed end of the annular chamber.

19. The coupling as defined in claim 13 characterized further to include:
at least one flexible, non-extensible fabric mat positioned between said elastomeric annular compression cushion and within the rope loops of said at least one non-extensible rope.

20. The coupling as defined in claim 19 characterized further in that said at least one fabric mat comprises a fabric embedded in an elastomeric material and connected to said at least one non-extensible rope by vulcanizing.

21. The coupling as defined in claim 20 characterized further to include:
at least one additional flexible, non-extensible fabric mat comprising fabric embedded in an elastomeric material and vulcanized on the outside of said at least one non-extensible rope and on said annular elastomeric compression cushion.

22. The coupling as defined in claim 13 characterized further to include:
a non-extensible, substantially rigid annular body disposed within the axially innermost portion of the substantially cylindrical annular chamber of said annular compression cushion.

23. The coupling as defined in claim 13 characterized further to include:
   at least one additional non-extensible rope interconnecting said inner and outer coupling members, said additional rope forming a plurality of rope loops around said annular toroidal compression cushion in uniform distribution along the peripheries of said inner and outer coupling members, said at least one non-extensible rope forming a plurality of loops inclined in one peripheral direction and said at least one additional non-extensible rope providing a plurality of rope loops inclined in the opposite peripheral direction.

24. The coupling as defined in claim 23 characterized further in that each rope loop of said at least one additional non-extensible rope crosses a respective rope loop of said at least one non-extensible rope.

* * * * *